US012675463B2

(12) United States Patent
  Canfield

(10) Patent No.: US 12,675,463 B2
(45) Date of Patent: Jul. 7, 2026

(54) APPARATUSES, SYSTEMS, AND METHODS FOR PROVIDING AN EVENT MANAGEMENT FRAMEWORK FOR A GEOGRAPHIC INFORMATION SYSTEM

(71) Applicant: SCHNEIDER ELECTRIC USA, INC., Andover, MA (US)

(72) Inventor: Andrew Oliver Canfield, Plains, MT (US)

(73) Assignee: Schneider Electric USA, Inc., Andover, MA (US)

( * ) Notice: Subject to any disclaimer, the term of this patent is extended or adjusted under 35 U.S.C. 154(b) by 191 days.

(21) Appl. No.: 18/160,673

(22) Filed: Jan. 27, 2023

(65) Prior Publication Data

US 2023/0237050 A1    Jul. 27, 2023

Related U.S. Application Data

(60) Provisional application No. 63/267,227, filed on Jan. 27, 2022.

(51) Int. Cl.
  *G06F 16/23*    (2019.01)
  *G06F 16/25*    (2019.01)
  *G06F 16/29*    (2019.01)

(52) U.S. Cl.
  CPC ...... *G06F 16/2379* (2019.01); *G06F 16/2358* (2019.01); *G06F 16/258* (2019.01); *G06F 16/29* (2019.01)

(58) Field of Classification Search
  None
  See application file for complete search history.

(56) References Cited

U.S. PATENT DOCUMENTS

| | | |
|---|---|---|
| 2005/0097108 A1 | 5/2005 | Wang et al. |
| 2008/0281839 A1* | 11/2008 | Bevan ...................... G06F 16/29 |
| 2009/0240869 A1* | 9/2009 | O'Krafka ............ G06F 12/0284 |
| | | 710/316 |
| 2011/0004446 A1 | 1/2011 | Dorn et al. |
| 2011/0215945 A1 | 9/2011 | Peleg et al. |
| 2020/0294039 A1* | 9/2020 | De Luca .............. G06Q 20/389 |
| 2021/0256071 A1* | 8/2021 | Lee ..................... G06F 16/2358 |

OTHER PUBLICATIONS

Extended European Search Report from corresponding European Application No. 23153620.2 dated Jun. 28, 2023.

* cited by examiner

*Primary Examiner* — Giuseppi Giuliani
(74) *Attorney, Agent, or Firm* — FIG. 1 Patents

(57) ABSTRACT

Apparatuses, systems, and methods are provided for managing events in a Geographic Information System (GIS). A first event may be detected which is associated with a change made via a mapping interface of the GIS. Information associated with the first event may be cached in a memory of a computing device. A second event associated with committing of the change in a database of the GIS may be detected, and in response to detecting the second event, a new event that is a transformation of the first event stored in the memory, the second event or both may be generated.

17 Claims, 9 Drawing Sheets

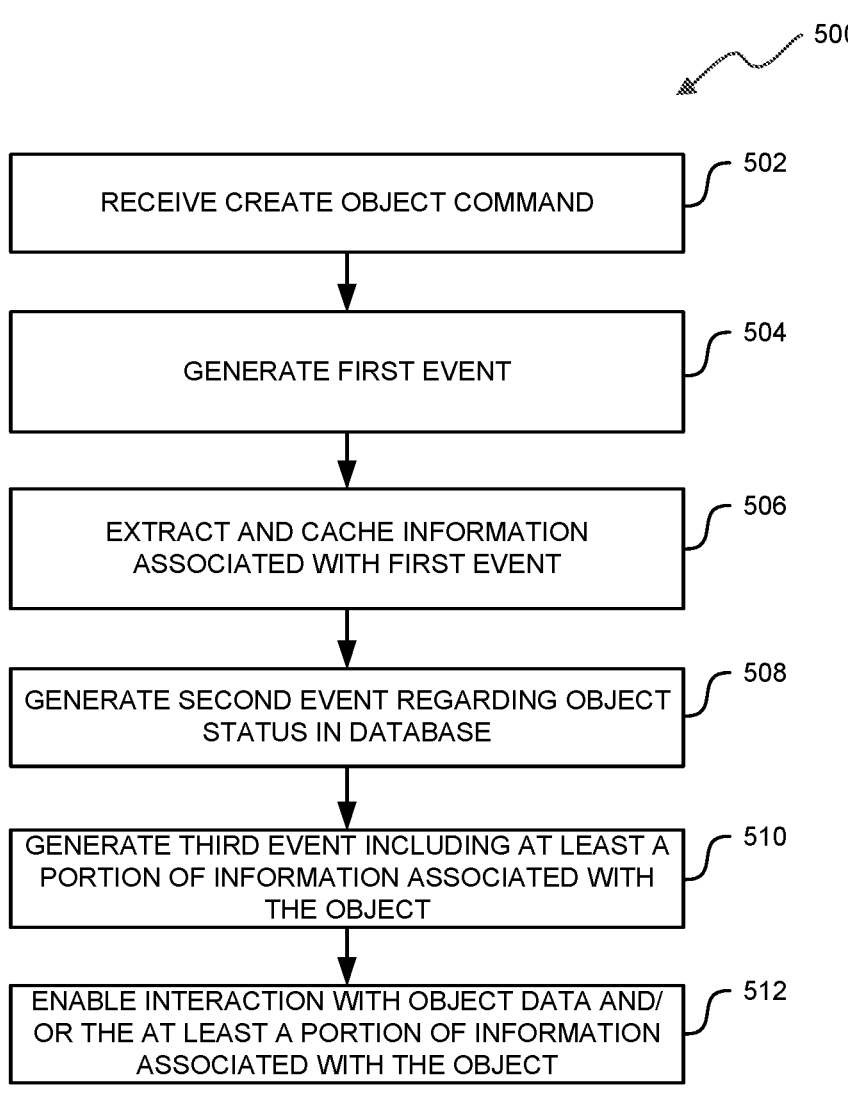

500

502 RECEIVE CREATE OBJECT COMMAND

504 GENERATE FIRST EVENT

506 EXTRACT AND CACHE INFORMATION ASSOCIATED WITH FIRST EVENT

508 GENERATE SECOND EVENT REGARDING OBJECT STATUS IN DATABASE

510 GENERATE THIRD EVENT INCLUDING AT LEAST A PORTION OF INFORMATION ASSOCIATED WITH THE OBJECT

512 ENABLE INTERACTION WITH OBJECT DATA AND/ OR THE AT LEAST A PORTION OF INFORMATION ASSOCIATED WITH THE OBJECT

FIG. 5

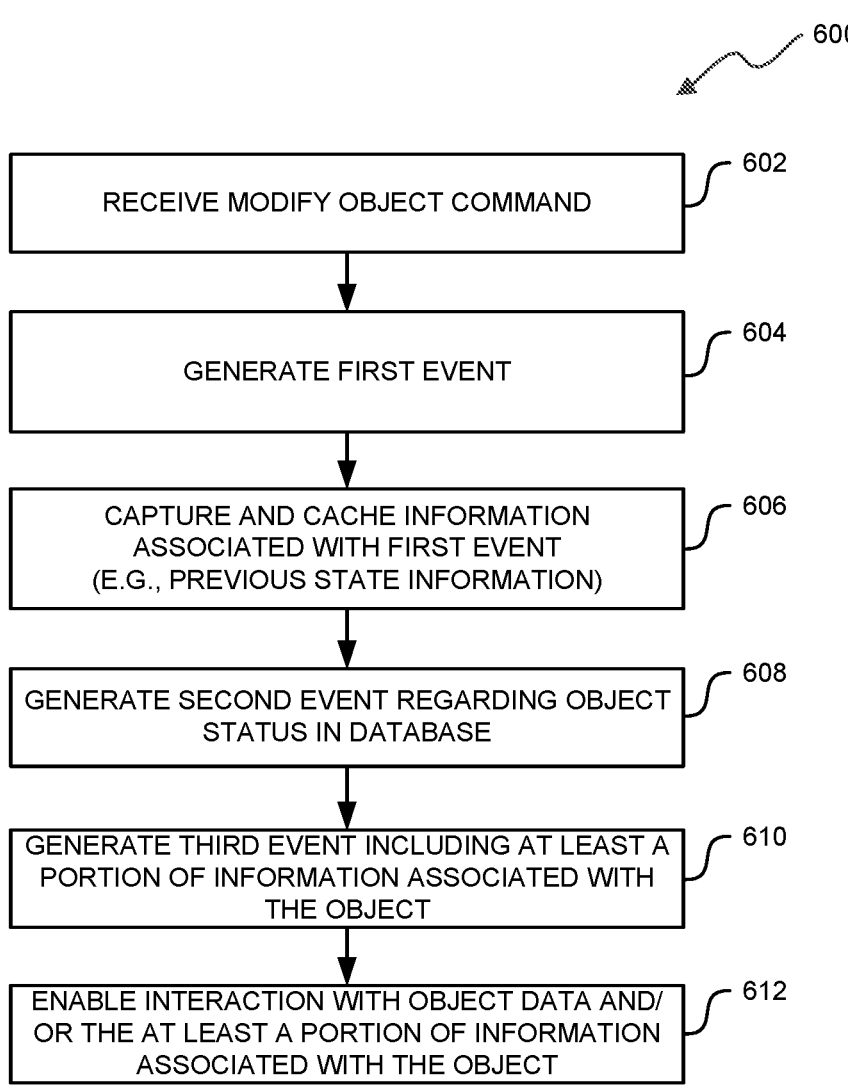

600

602
RECEIVE MODIFY OBJECT COMMAND

604
GENERATE FIRST EVENT

606
CAPTURE AND CACHE INFORMATION
ASSOCIATED WITH FIRST EVENT
(E.G., PREVIOUS STATE INFORMATION)

608
GENERATE SECOND EVENT REGARDING OBJECT
STATUS IN DATABASE

610
GENERATE THIRD EVENT INCLUDING AT LEAST A
PORTION OF INFORMATION ASSOCIATED WITH
THE OBJECT

612
ENABLE INTERACTION WITH OBJECT DATA AND/
OR THE AT LEAST A PORTION OF INFORMATION
ASSOCIATED WITH THE OBJECT

FIG. 6

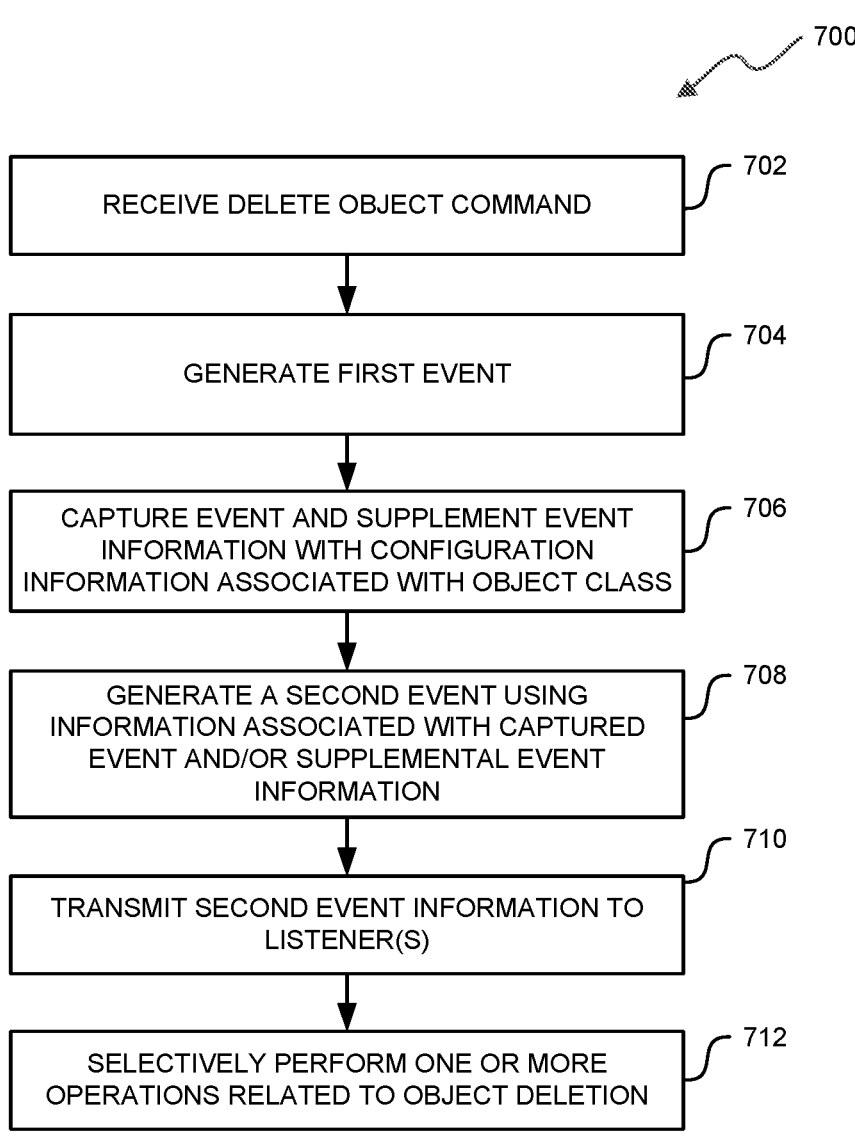

700

RECEIVE DELETE OBJECT COMMAND — 702

GENERATE FIRST EVENT — 704

CAPTURE EVENT AND SUPPLEMENT EVENT INFORMATION WITH CONFIGURATION INFORMATION ASSOCIATED WITH OBJECT CLASS — 706

GENERATE A SECOND EVENT USING INFORMATION ASSOCIATED WITH CAPTURED EVENT AND/OR SUPPLEMENTAL EVENT INFORMATION — 708

TRANSMIT SECOND EVENT INFORMATION TO LISTENER(S) — 710

SELECTIVELY PERFORM ONE OR MORE OPERATIONS RELATED TO OBJECT DELETION — 712

DETECT FIRST EVENT ASSOCIATED WITH MAPPING INTERFACE — 802

CACHE INFORMATION ASSOCIATED WITH FIRST EVENT AT COMPUTING DEVICE — 804

DETECT SECOND EVENT ASSOCIATED WITH DATABASE CHANGE — 806

GENERATE NEW EVENT AS A TRANSFORMATION OF FIRST EVENT, SECOND EVENT, OR BOTH — 808

APPARATUSES, SYSTEMS, AND METHODS FOR PROVIDING AN EVENT MANAGEMENT FRAMEWORK FOR A GEOGRAPHIC INFORMATION SYSTEM

RELATED APPLICATION

The present application claims priority to U.S. Provisional Patent Application Ser. No. 63/267,227, filed on Jan. 27, 2022, and entitled EVENT MANAGEMENT FRAME-WORK FOR GEOGRAPHIC INFORMATION SYSTEM, which is incorporated by reference herein in its entirety.

TECHNICAL FIELD

The present disclosure relates to providing an event management framework for a Geographic Information System (GIS).

BACKGROUND

Existing systems experience difficulties with Geographic Information System (GIS) software applications. GIS software applications typically have a frontend that includes a mapping interface visualizing a utility network and providing a user interface, and a backend that comprises one or more databases storing data describing the utility network. When a user makes changes to the utility network (e.g., by creating a new object, deleting an existing object, updating an existing object, and the like), the mapping interface generates an event. The event is then pushed to the backend to be committed. One of the drawbacks of the existing way of managing events is that the events contain only partial information. For example, an event may indicate that a row has been created but the information about the row (e.g., table name, row number, data fields, data field values, etc.) is inaccessible to another application because the event has not been pushed to the backend database. When the event is finally pushed to the database, another event is generated indicating that the edit is complete. However, this event is also not useful because it lacks information about the specific edit that was completed (e.g., which row? Which data field? What data values?). Furthermore, existing systems require unique code for event handling and thus face increased complexity, installation requirements, development requirements, and operational requirements. This is caused by requiring local event handlers to be executed locally at a client device. Thus, there is increased burden in implementation and maintenance, as both must be performed on a per-device basis. Similarly, use of triggers for relational databases requires unique and static coding, which must be recreated for database changes, and thus is not reusable. Such unique trigger code is not capable of transitioning between databases, thus suffering numerous detriments.

SUMMARY

One or more Event Management Frameworks (EMFs) disclosed herein may overcome the above-identified deficiencies and other drawbacks associated with Geographic Information System (GIS) applications and may provide several benefits over the prior art as described in detail below. Although described with reference to GIS applications and systems, it should be appreciated that various aspects of the present disclosure may be implemented in one or more additional or alternative fields, for example any system which implements a database or data store which is accessed and selectively modified using one or more other computing elements. For example, any data storage configuration which permits access to and one or more data operations by a different computing element or user.

The present application describes an EMF useable with a GIS. The EMF allows capture of events triggered by one application (e.g., GIS software), transforms those events into useful events and dispatches the transformed events to one or more other applications. The events can be transformed through the process of reordering, supplementing, correcting, chaining, and/or other adaptations, or a combination thereof. The transformed events can then be consumed by one or more applications enabling them to respond to changes more effectively such as updates, corrections, data validations, etc., made to the GIS database via a mapping interface (e.g., a user interface provided at a client device).

In addition to transforming two or more events into a single useful event that is consumable by other applications, the EMF has additional benefits. For existing systems, each application that wants to consume an event has to create its own code. In an example of a fiber optic cable application, there are hundreds of tables corresponding to different kinds of cables, buffer tubes, etc., and many possible events. This would require thousands of lines of additional code and engineering time for configuration. Using aspects of the EMF described herein, it is possible to reuse the same or similar piece of code (e.g., an event handler or listener as described herein) to handle multiple events and to map the piece of code to individual tables. This feature makes the EMF described herein highly configurable, and the same code can be quickly adapted for different utility networks such as fiber optics, electric, water, gas, and/or the like. Furthermore, by implementing a Representation State Transfer (REST)-style solution rather than a Component Object Model (COM), implementations consistent with the present disclosure are much simpler to implement and maintain, and code may be quickly and easily reused. This may be accomplished, for example, in whole or in part by virtue of a single server installation of code (e.g., listener) associated with an EMF event, rather than requiring installation at each device.

In one embodiment, the EMF is a software-implemented feature that can reside inside a GIS software application (e.g., at a server of a GIS system). The Framework can listen for and capture a first event generated at the frontend by caching information about the change associated with the first event, for example when the first event is received at the server of the GIS system. When a second event indicating the change is completed is generated by the backend (e.g., at a GIS server), the EMF can generate its own event (hereinafter "after event") that is a transformation of the first and/or second events. The specific transformations may depend on the type of event.

According to some aspects of the present disclosure, a first event generated at a client device may be captured by an EMF executing at a server which is capable of selectively caching information relating to the first event when the first event is detected by the EMF. At least one operation may be performed in relation to the first event by the server, and at least one EMF event may be generated in relation to the first event or another event associated with the first event, such as a database commit. This may permit the EMF to publish an EMF event to one or more listeners, such as third-party applications, modules, or code registered with the EMF at the server, and which may be configured to listen for one or more EMF events and perform one or more operations corresponding thereto. This may include a user or group implementing their own application(s), module(s), and/or code segments which are configured to perform one or more operations responsive to an associated published EMF event. The one or more listeners may register with an EMF in relation to an EMF event to receive an information when the EMF event occurs. This enables only a small portion of code to be easily reusable based upon an event in relation to a class or table, for example. During operation, an EMF executing on a device may be configured to listen for one or more first events and/or second events and to selectively generate one or more EMF events.

During operation, a first event may begin at a GIS software of a client device. The first event may be transmitted to a backend GIS web server. The GIS web server, using aspects of an EMF described herein, may receive the event and generate its own events. The EMF may accomplish this by monitoring or intercepting the client event and aggregating it with one or more server events and generating its own EMF events which may then be dispatched to one or more listeners which may be pieces of reusable code located at the EMF server device. The GIS web server may act on the first event to perform one or more changes, updates, or alterations of data in the GIS database or databases. Listeners can take the aggregated event and act on the same data in the GIS database or other related data or reach out to other systems on the same machine or across various networks to interact with data on the other networks or environments.

According to aspects of the present disclosure, provided is a method of managing events in a GIS. The method includes detecting a first event associated with a change made via a mapping interface of the GIS, caching information associated with the first event in a memory of a computing device, detecting a second event associated with committing of the change in a database of the GIS, and in response to detecting the second event, generating a new event that is a transformation of the first event stored in the memory, the second event or both. The detecting the first event occurs at a client device of the GIS, and the caching information, the detecting the second event, and the generating the new event are performed by an EMF executing on the computing device of the GIS. An indication of the first event may be transmitted from the client device to the computing device. The method may include transmitting the new event to one or more listeners and performing at least one operation by at least one of the one or more listeners responsive to the transmitted new event. The change made may be an object creation operation, and the first event may be an object creation event. The change made may be an object change operation and the first event may be an object change event. The change made may be an object deletion operation and the first event may be an object delete event. The transformation of the first event stored in the memory, the second event, or both may include one or more of reordering, supplementing, correcting, or chaining the first event stored in the memory, the second event or both.

According to further aspects of the present disclosure, provided is a system for providing event management for data operations. The system includes a communication network, a device, and a server. The device includes a processor, a device communication section configured to enable communications over the communication network, an interface configured to enable access to GIS data and configured to receive one or more events associated with at least a portion of the GIS data, a device storage configured to store GIS data associated with the interface, and a GIS module configured to generate a first event of the one or more events associated with the interface and to transmit the first event via the communication section. The server includes a processing section, a server communication section configured to enable communications over the communication network, a GIS database configured to store GIS information, a GIS operation section configured to receive the first event from the device and to perform at least one operation in association with the GIS database based at least in part upon the first event; an Event Management Framework (EMF) section configured to detect the first event and to generate a second event based at least in part upon a status of the at least one operation performed by the GIS operation section responsive to the first event, the EMF section further configured to generate an EMF event which is a transformation of the first event, the second event or both, and at least one listener configured to obtain the EMF event and to coordinate at least one listener operation response to obtaining the EMF event. The first event may be an object creation event received at the interface of the device. The first event may be an object change event received at the interface of the device. The first event may be an object deletion event received at the interface of the device. The server may include a memory and the EMF section may cache the first event or information associated with the first event at the memory responsive to detecting the first event. The transformation of the first event, the second event or both may include one or more of reordering, supplementing, correcting, or chaining the first event, the second event or both. The second event may be a commit operation performed by the GIS database.

Although described with reference to GIS data and GIS systems, it should be appreciated that aspects of the present disclosure may be implemented in numerous other fields, such as any database implementation or other usage where one or more events occur and can be used as a trigger to perform one or more operations in relation to the one or more events. Put another way, implementations described herein are not limited to only operating in relation to GIS data but may be extended to any form of data or metadata without departing from the spirit and scope of the present disclosure. Furthermore, one or more code sections associated with a listener are not required to be static according to aspects of the present disclosure, and thus may enable a single code section or portion thereof to be applied across multiple events while, even enabled to handle different events having different event data in a similar or the same manner and may provide the ability to provide one or more proactive operations based at least in part upon a detected event. This may be advantageous, for example, where user makes a change to database data. One or more listeners may then be notified of the detected event and execute one or more operations across one or more computing systems or elements, either symmetrically and/or asymmetrically. For example, a detected GIS event such as adding a new utility installation may be used to trigger multiple non-GIS and/or non-utility operations.

Numerous other objects, features, and advantages of the present invention will be readily apparent to those skilled in the art upon a reading of the following disclosure when taken in conjunction with the accompanying drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 5 illustrates an embodiment of a method for creating an object according to aspects of the present disclosure.

FIG. 6 illustrates an embodiment of a method for modifying an object according to aspects of the present disclosure.

FIG. 7 illustrates an embodiment of a method for deleting an object according to aspects of the present disclosure.

Identical reference numerals have been used, where possible, to designate identical elements that are common to the figures. However, elements disclosed in one embodiment may be beneficially utilized on other embodiments without specific recitation.

DETAILED DESCRIPTION

The present application describes an event management framework usable with a Geographic Information System (GIS) ("Event Management Framework"). The Event Management Framework (EMF) allows capture of events triggered by one application (e.g., GIS software), transforms those events into useful events and dispatches the transformed events to one or more other applications. The events can be transformed through the process of reordering, supplementing, correcting, chaining, and/or other adaptations, or a combination thereof. The transformed events can then be consumed by one or more applications enabling them to respond to changes more effectively such as updates, corrections, data validations, etc., made to the GIS database via a mapping interface (e.g., user interface). The EMF may be configured to execute on a server and to detect information relation to one or more first events from GIS software executing on a device separate from the server. The EMF may be further configured to detect one or more second events performed by the server and/or corresponding database and to generate one or more EMF events based at least in part upon the one or more first events and/or the one or more second events.

Figure 1:
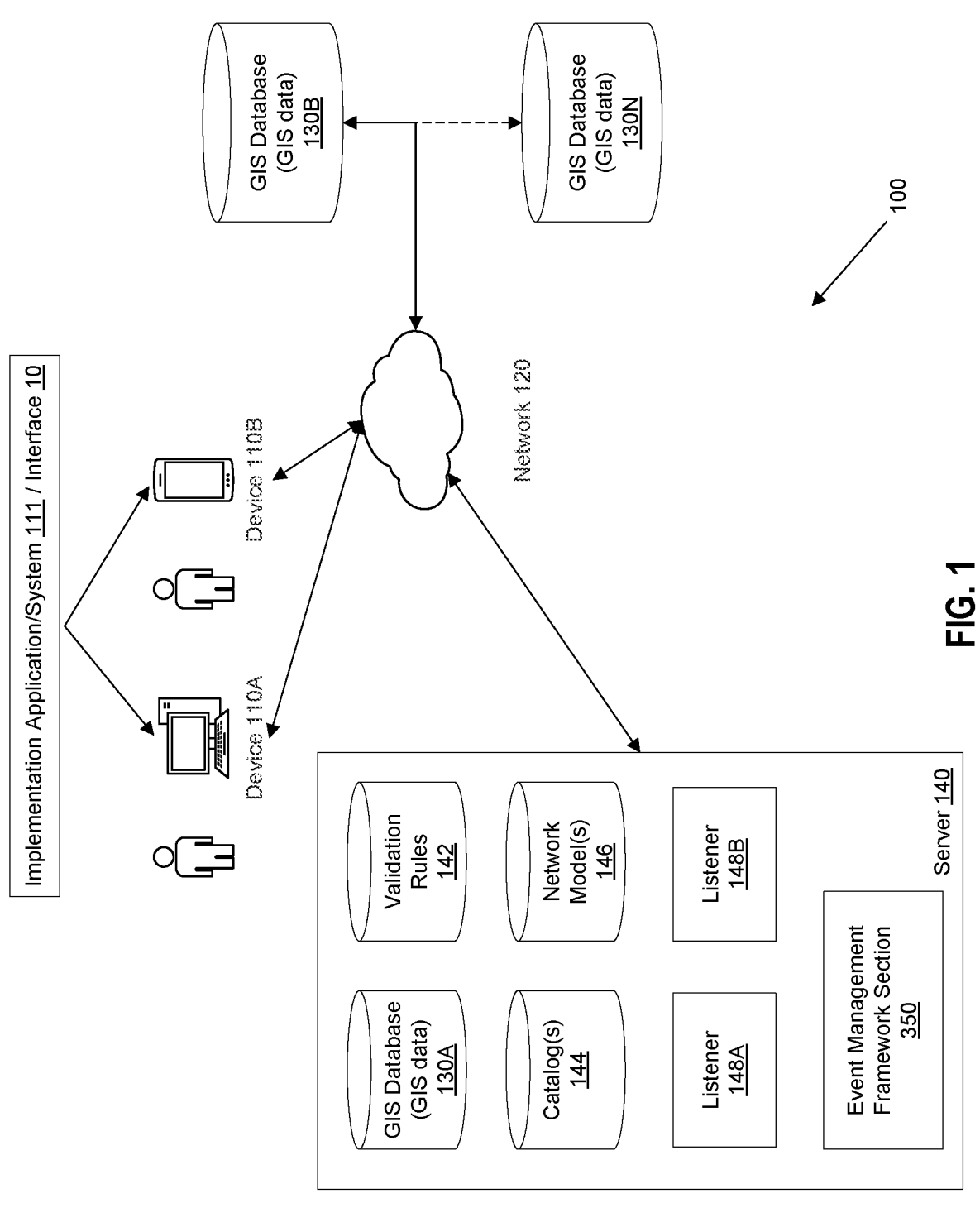
FIG. 1 illustrates a partial block diagram illustrating an example environment useable according to aspects of the present disclosure.

FIG. 1 illustrates a partial block diagram illustrating an example environment in which a system and method for communicating network information to a GIS and/or other devices or systems (hereinafter "disclosed system") can operate.

As illustrated, the environment 100 comprises one or more client devices 110A, 1106 (hereinafter client device 110 or device 110), a network 120 and one or more GIS databases 130A, 130B, 130N (hereinafter GIS database 130 or database 130). The client device 110 can be any hardware device that is able to establish a connection with another device or server, directly or via a communication network, for example network 120. Examples of a client device 110 include, but are not limited to: a desktop computer, a thin-client device, a mobile computing device such as a notebook, a laptop computer, a handheld computer, a mobile phone, a smart phone, a tablet, a phablet, and/or the like. The client device 110 typically includes one or more input/output devices to facilitate user interaction (e.g., to display a map, to enable a user to make a selection of an area or element on the map).

In some embodiments, aspects of the disclosed system can be embodied in at least one implementation application/system 111 (hereinafter "interface 10") which is installed or installable at the client device, and/or accessible in the client device 110 (e.g., via the network 120). The interface 10 can be downloaded from a server (e.g., server 140, an application store, or a repository) and installed on the client device 110. In some embodiments, the interface 10 can be and/or can access a web-based application or portal that can be accessed via a web-browser. Additionally or alternatively, the interface 10 may be a web-browser capable of accessing a remote website or data location, for example via the network 120. In some embodiments, the interface 10 can operate by utilizing data stored in the browser's local storage (e.g., network model data or cached map data may remain in the client device 110 but the data may be periodically backed up in the host server or a cloud—for example via the network 120). The interface 10 may be a GIS software application useable according to aspects of the present disclosure.

The GIS database 130 (e.g., "database 130") may be a database or file structure configured to store one or more objects defined in a geometric space. One example of a GIS database is a geodatabase. Typically, each utility maintains its own GIS database, although one or more GIS database 130 or portion thereof may be physically and/or logically separate from a particular utility. An example of a utility maintaining its own GIS database includes a gas company having its own GIS database that stores feature data for its gas distribution network. Similarly, an electric company can have its own GIS database that stores feature data for its electric distribution network. The GIS database 130 typically supports query execution on stored data as well as manipulation of the stored data. Examples of data stored in the GIS database include but are not limited to: geometry or shape data and attributes of objects, typically grouped into different feature classes. Additionally or alternatively, a database 130 may be any repository configured to store one or more sets of data, without being specifically limited to GIS data. The GIS database 130 may be implemented in Microsoft SQL Server, PostgreSQL relational database management systems, Microsoft Access, Oracle, IBM DB2, IBM Informix, and/or the like.

In some embodiments, the environment 100 includes a server 140 (e.g., computing device). The server 140 can provide access to validation rules 142, catalog(s) 144, and/or network model data 146. These data can be stored in one or more databases or database tables. In various embodiments, the server 140 may include the GIS database 130 (e.g., GIS database 130A) or subset thereof. The validation rules 142 can include rules to ensure that a network design meets certain requirements and/or standards. Typically, validation rules are specific to a distribution network. For example, in a gas distribution network, an applicable validation rule may be the diameter of a gas valve must match the diameter of the pipe to which the valve is snapped. By way of another example, in an electric distribution network, an example validation rule may be that the rated kVA of a transformer bank must be sufficient to handle the expected peak power demand of the customers connected to the transformer. The validations rules 142 can be configured and extended to meet the specific requirements of a user designing a network or an enterprise/organization (e.g., via an interface 10). The catalogs 144 can store components and design configurations that a user can use to design and/or manipulate a network and/or or one or more components or subsets thereof. The network model(s) 146 can store various representations of network components and topologies associated with network designs. The network models 146 are generally created client-side and can be uploaded to the host server periodically or on demand for back up or for reuse. In some embodiments, one or more network models 146 may be stored client side at a client device 110 and/or may be stored at one or more physically and/or logically separate storage locations, either in whole or in part.

The server 140 may include an Event Management Framework (EMF) Section 350 (as described further herein with reference to FIG. 3) configured to perform one or more event management operations. The server 140 may further include one or more application, module, code section, or other element useable to perform at least one listening operation corresponding to an EMF event. For example, one or more listeners 148A, 148B may be provided at one or more servers 140 for performing at least one operation responsive to a corresponding EMF event being generated (e.g., by an EMF section 350 described herein). Listeners 148 may be any code, code section, executable, or information associated with one or more EMF events. The EMF section 350 may be configured to monitor communications associated with the server 140 and one or more operations of the server 140, such as interactions with GIS database 130.

The network 120, over which the client devices 110, the one or more GIS databases 130, and the server 140 can communicate may be a telephonic network, an open network, such as the Internet, or a private network, such as an intranet and/or the extranet. The network 120 can be any collection of distinct communication networks operating wholly or partially in conjunction to provide connectivity to the client devices 110 and the GIS databases 130 and may appear as one or more communication networks to the serviced systems and devices. In some embodiments, communications can be achieved by a secure communications protocol, such as secure sockets layer (SSL), or transport layer security (TLS).

In addition, communications can be achieved via one or more wireless networks, such as, but not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 4G-LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. The client devices 110 can be coupled to the network 120 (e.g., Internet) via a dial up connection, a digital subscriber loop (DSL, ADSL), cable modem, and/or other types of connection. Thus, the client devices 110 can communicate with remote servers (e.g., one or more of a server 140, a GIS database 130, a mail server, an instant messaging server, etc.), some of which may provide access to user interfaces of the World Wide Web via a web browser, for example.

The client device 110 may function in various embodiments as a thin client device which obtains at least a portion of data from a server 140 for operation (e.g., GIS data). The client device 110 may be operable to cache/store the at least a portion of data from the server 140 for presentation to a user of the client device 110, for example viewable via a mapping interface displayable to the user and which enables the user to view and/or perform one or more actions in association therewith. The client device 110 may be configured to obtain the at least a portion of data from the server 140, to display the at least a portion of data from the server 140 to a user of the client device 110, to receive at least one input command or operation from the user in relation to the at least a portion of data, and to transmit to the server 140 a representation of the at least one input command or operation. The server 140 may be configured to receive the at least one input command or operation and to selectively detect at least one first event associated therewith (e.g., using an EMF section 350 thereof, as described herein). The at least one first event may include a create event, an update event, a delete event, or any data operation or combination thereof. Responsive to the first event, the server 140 may perform at least one data operation, and may generate a second event in relation to the at least one data operation (e.g., a commit operation). An EMF event may be generated by the EMF section 350 of the server 140 and the EMF event may be published to one or more listeners 148 which are registered with the EMF section to receive event notifications in relation to the first event and/or second event.

Figure 2:
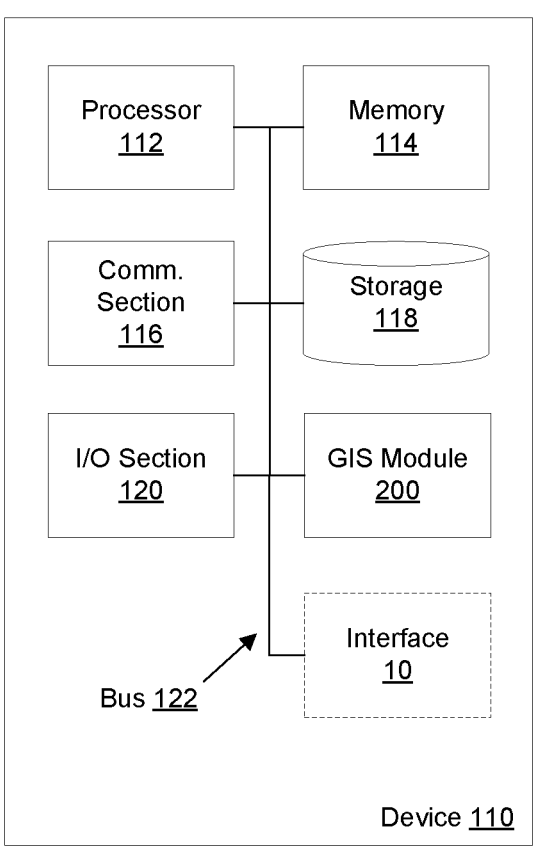
FIG. 2 illustrates a block diagram of an embodiment of a client device according to aspects of the present disclosure.

FIG. 2 illustrates a block diagram of an embodiment of a client device according to aspects of the present disclosure. A client device 110 (e.g., a device 110) may include one or more of a processor 112, a memory 114, a communication section 116, a storage 118, an input/output (I/O) section 120, a GIS module 200, and/or an interface 10. One or more of the processor 112, memory 114, communication section 116, storage 118, I/O section 120, GIS module 200, and/or interface 10 may be communicatively coupled or coupleable to one another via a conductive bus 122. Although illustrated as part of a device 110, it should be appreciated that one or more of the processor 112, memory 114, communication section 116, storage 118, I/O section 120, GIS module 200, and/or interface 10 may be physically and/or logically separate from the device 110. For example, one or more of the processor 112, memory 114, communication section 116, storage 118, I/O section 120, GIS module 200, and/or interface 10 may be accessed by the device 110 over a communications medium such as network 120, either in whole or in part.

The processor 112 may by any hardware and/or software processor, for example one or more hardware processor such as an Intel® Pentium-type processor, a Motorola® PowerPC, a Sun® UltraSPARC®, a Hewlett-Packard® PA-RISC processors, or any other type of hardware processor. Additionally or alternatively, the processor 112 may be or include one or more virtual or software processors configured to perform at least one operation described herein. The memory 114 may be a volatile, random-access memory such as a dynamic random-access memory (DRAM) or static memory (SRAM), and/or may be or include at least one non-volatile memory. The communication section 116 may be any wired and/or wireless communication elements configured to permit the device 110 to communicate, for example via the network 120. The storage 118 may be configured to store one or more sets of information useable by or in association with the device 110. For example, the storage 118 may be configured to store one or more sets of instructions executable by the processor 112 to perform one or more operations. Additionally or alternatively, the storage 118 may be configured to store one or more sets of data used by and/or useable in association with the GIS module 200 and/or interface 10.

The I/O section 120 may be any input and/or output element useable by or in conjunction with the device 110. For example, the I/O section may include one or more display unit or controller configured to permit output to a user. Output may include any visual, audio, audiovisual, tactile, or any other form of perceptible information by a user or group of users. Additionally or alternatively, the I/O section may include one or more input units, such as a keyboard, a mouse, a trackpad, a trackball, or any other element capable of receiving an input from a user or group of users associated with the device 110.

The device 110 may include a GIS module 200. The GIS module 200 may include one or more applications, data sets, interfaces, modules, and/or elements configured to provide or to assist in providing one or more GIS operations or services by or in conjunction with the device 110. In various embodiments, the GIS module 200 may include or be associated with the interface 10 and/or elements thereof. For example, the GIS module 200 may include an application or portal configured to perform one or more operations described herewith with reference to the interface 10, either alone or in conjunction with a communicatively coupleable element such as a server, data store, or other source of information and/or metadata.

Figure 3:
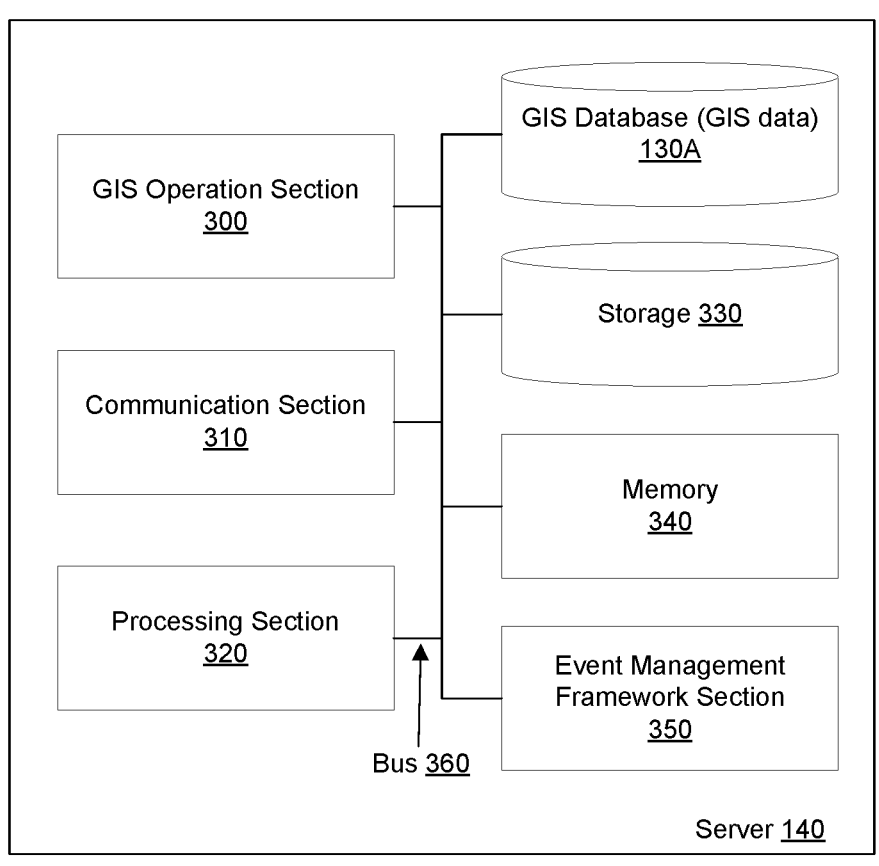
FIG. 3 illustrates a partial block diagram of an embodiment of a server according to aspects of the present disclosure.

FIG. 3 illustrates a partial block diagram of an embodiment of a server according to aspects of the present disclosure. The server 140 may include one or more of a GIS operation section 300, a communication section 310, a processing section 320, a storage 330, a memory 340, an Event Management Framework (EMF) section 350, and/or a GIS database 130A. One or more of the GIS operation section 300, the communication section 310, the processing section 320, the storage 330, the memory 340, the EMF section 350, and/or the GIS database 130A may be communicatively coupled or coupleable to one another via a conductive bus 360. The GIS operation section 300 may include one or more modules, executables, sections of code, interface, and/or other hardware or software elements configured to perform or enable one or more GIS operations to be performed by the server 140 or in conjunction with the server 140. The GIS operation section 300 may be configured to transmit at least a portion of data associated with the GIS database 130A to a device 110 via the network 120. This may permit the device 110 to view and/or operate on the at least portion of data and to provide one or more command or operation using an interface 10 of the device 10. The GIS operation section 300 may be configured to receive the one or more commands or operations and to coordinate one or more corresponding operations. The EMF section 350 may be configured to monitor and/or intercept one or more communications between the server 140 and the device 110 and may monitor one or more operations of the server 140 to detect and/or generate one or more events described herein.

The EMF section 350 may be configured to perform one or more EMF operations including a listening (e.g., monitoring) operation corresponding to an event such as a first event. This may include monitoring or observing one or more operations received from a device 110 and/or database operation requested or performed based at least in part upon an operation or command associated with the device 110. The EMF section 350 may be configured to generate one or more EMF events responsive to the listening operation, for example by detecting a first event associated with an action of the device 110 and a second event relating to operation of the server 140, such as one or more database operations such as a commit or other operation. The EMF section 350 may be configured to publish information (e.g., an EMF event and/or information associated with a first event) to one or more listeners (e.g., one or more listeners 148 provided at one or more servers 140). The one or more listeners may include one or more applications, modules, and/or code segments configured to perform or assist in performing one or more operations responsive to receiving an indication of an EMF event. One or more listener 148 may be or include reusable code associable with one or more EMF events. In doing so, the EMF section 350 may enable cross-platform and cross-protocol event handling, for example by being capable of identifying an event of a first computing environment and using a listener 148 to execute one or more operations at a second computing environment based at least in part upon the first event associated with the device 110 and/or a second event associated with the server 140.

The processing section 320 may by any hardware and/or software processor, for example one or more hardware processor such as an Intel® Pentium-type processor, a Motorola® PowerPC, a Sun® UltraSPARC®, a Hewlett-Packard® PA-RISC processors, or any other type of hardware processor. Additionally or alternatively, the processing section 320 may be or include one or more virtual or software processors configured to perform at least one operation described herein. The memory 340 may be a volatile, random-access memory such as a dynamic random-access memory (DRAM) or static memory (SRAM), and/or may be or include at least one non-volatile memory. The communication section 310 may be any wired and/or wireless communication elements configured to permit the server 140 to communicate, for example via the network 120. The storage 330 may be configured to store one or more sets of information useable by or in association with the server 140. For example, the storage 330 may be configured to store one or more sets of instructions executable by the processing section 320 to perform one or more operations. Additionally or alternatively, the storage 330 may be configured to store one or more sets of data used by and/or useable in association with the GIS operation section 300, the GIS module 200, and/or interface 10. In various embodiments, the storage 330 may be configured to store at least a portion of GIS data useable by the GIS operation section 300, the GIS database 130A, and/or the EMF section 350. One or more listener 148 may be implemented by one or more of the GIS operation section 300, the communication section 310, and/or the processing section 320, either alone or in combination and to perform or assist in performing one or more corresponding operations. Accordingly, one or more code segments, modules, executables, commands, or the like may be provided at the server 140 or in conjunction with the server 140 to function as a listener 148 and to selectively perform one or more operations in the event of an EMF event to which a particular listener 148 is associated.

Figure 4:
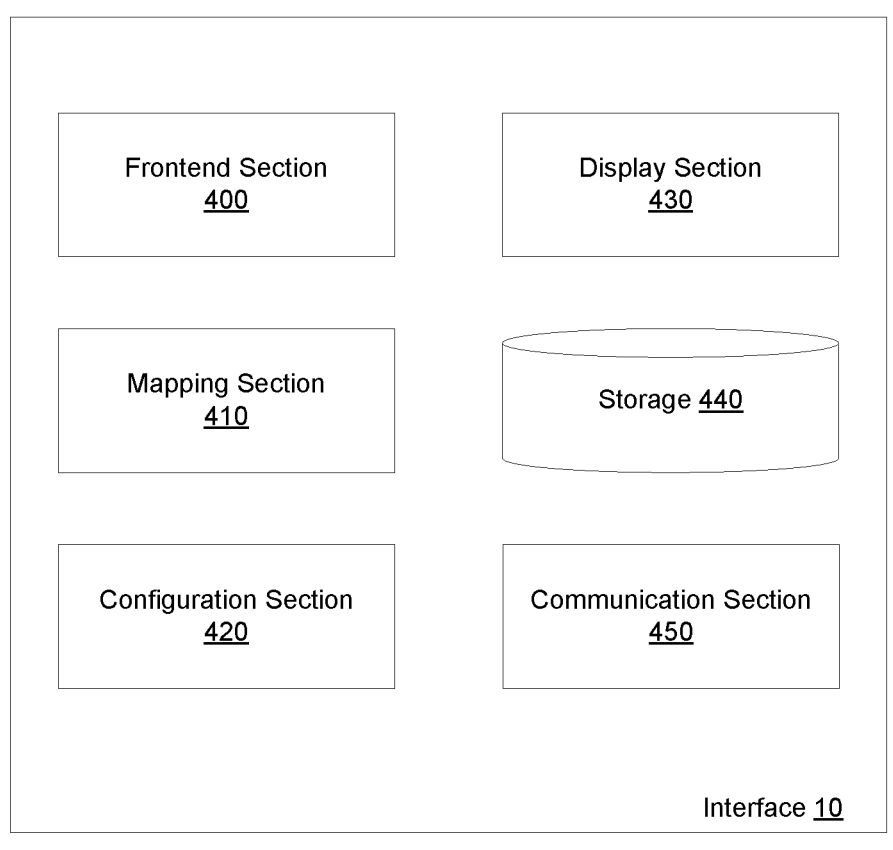
FIG. 4 illustrates a partial block diagram of an embodiment of an interface according to aspects of the present disclosure.

FIG. 4 illustrates a partial block diagram of an embodiment of an interface according to aspects of the present disclosure. The interface 10 may be a GIS software application in various embodiments which may either be installed at or otherwise accessible to the device 110 (e.g., e.g., using a web browser via the network 120). An interface 10 may include one or more of a frontend section 400, a mapping section 410, a configuration section 420, a display section 430, a storage 440, and/or a communication section 450. The frontend section 400 may be any executable, data set, metadata, module, code portion, instruction(s), or information locally accessible at a device operating or assisting in operating the interface 10. A mapping section 410 may enable one or more mapping operations, for example corresponding to at least one geographic map or subset thereof in conjunction with one or more objects or elements associated therewith. For example, the mapping section 410 may be configured to provide or assist in providing object data in relation to geographic location information which may be viewed, accessed, modified, added, changed, updated, and/or deleted, for example using the display section 430. The display section 430 may include one or more hardware and/or software elements capable of displaying or assisting in displaying one or more sets of data or information in relation to the interface 10. This may include, for example, one or more hardware devices or software elements such as drivers to permit a user of a device associated with the interface 10 to view GIS data and to optionally perform one or more operations associated with GIS data, for example using a graphical user interface associated with the interface 10 via a device 110. Although described with reference to display, it should be appreciated that the display section 430 may provide one or more hardware and/or software elements for obtaining or assisting in obtaining input from a user associated with the interface 10. In various embodiments, a combination of the mapping section 410 and the display section 430 may combine to form aspects of a mapping interface as described herein.

The storage 440 may be provided to store or assist in storing one or more sets of GIS data and/or one or more sets of data useable by the interface 10 perform one or more operations described herein (e.g., in embodiments where the interface 10 is either wholly or partially separate from a device 110). In various embodiments the storage 440 may include a memory configured to cache/store at least a portion of data received from a server 140, for example at least a portion of GIS data viewable and/or usable by the device 110 for presentation to a user via the display section and which permits a user of the device 110 to view and/or provide at least one input command or operation in association with one or more elements of the at least a portion of data.

The configuration section 420 may provide one or more hardware and/or software elements configured to enable the interface 10 to perform at least one operation described herein. Additionally or alternatively, the configuration section 420 may include one or more sets of configuration data, for example to assist in operation of the interface 10. This may include one or more sets of configuration data to enable the interface 10 to transmit one or more input command or operations from the device 110 to a server 140. In various embodiments this may be accomplished by maintaining or obtaining communication information relating to one or more servers 140 or communications elements or maintaining or obtaining one or more locations for obtaining communication information for publishing commands and/or operations (e.g., network address information, remote broadcast location, server information, or the like) or object information or metadata relating thereto, for example. The communication section 450 may be any wired and/or wireless communication elements configured to permit the interface 10 to communicate, for example via the network 120.

FIG. 5 illustrates an embodiment of a method for creating an object according to aspects of the present disclosure. A process 500 includes an operation 502 where a command to create an object is received. This may include a user of a device 110 selecting an object creation element of an interface 10, for example using a graphical user interface (GUI) thereof. The create object command may be received from a user and may include a user creating a new row via a mapping interface of the interface 10. A first event may be generated at an operation 504 responsive to the received create object command, for example by a mapping interface of the interface 10. The EMF section 350 may be configured to detect the first event by monitoring or observing one or more commands or operations received from the device 110. Information associated with the first event may be extracted and cached at an operation 506. This may include the EMF section 350 being configured to extract information associated with the first event and caching the information in memory 340 and/or storage 330 of the server 140. The change in GIS data associated with the create object command may then be committed at a database (e.g., at the GIS database 130A of the server 140). Once the change has been committed, a second event regarding the object status in the database may be generated at an operation 508. Responsive to the second event, the EMF section 350 may generate a third event at an operation 510 (e.g., an EMF event) which includes at least a portion of the information associated with the object. This may include the EMF section 350, in response to the second event, generating a new event (e.g., an "After Created Event") that includes some or all the information relating to the creation of the new object that has been committed to the database, and may include additional configuration information specific to the class of object being created. Interaction with object data and/or the at least a portion of information associated with the object may be enabled at an operation 512, for example by one or more listeners having obtained the third event or information thereof. Thus, one or more third-party listeners, applications, or modules (e.g., one or more listeners 148) may be enabled to operate based at least in part upon the database change once the EMF event is published to the listeners by the EMF section 350. As the third event includes all relevant information about the creation of the new object in the database, any application can consume the event and take any actions in response to the event using at least one listener 148.

FIG. 6 illustrates an embodiment of a method for modifying an object according to aspects of the present disclosure. A process 600 includes an operation 602 where a command to modify an object is received. This may include a user of a device 110 selecting an object modification element of an interface 10, for example using a GUI thereof. The modify object command may be received from a user and may include a user updating an existing object (e.g., a row) via a mapping interface of the interface 10. Additionally or alternatively, an object modification command may be inferred by the EMF section 350 in relation to a user operation in association with at least one object or command or operation associated therewith received at the server 140. The EMF section 350 may be configured to identify a first or previous state of the object and/or of other objects or elements. A first event may be generated at an operation 604 responsive to the received modify object command, for example by a mapping interface of the device 110. The EMF section 350 may be configured to detect the first event by monitoring or observing one or more commands or operations received from the device 110. The first event may include information corresponding to a first or before state of the object. For example, a first or before state of a row or information about at least a portion of a row in a first state and/or a before state may be included with the first event. This may provide benefits over existing systems, in which when a database is queried for changes to the object (e.g., row), it is only possible to see the after state of the database but all information about the before state of the object is lost. Information associated with the first event (e.g., first or previous state information) may be captured and/or cached at an operation 606, for example using the EMF section 350 in conjunction with the memory 340 and/or storage 330. At least one aspect of the operation 606 may be performed by in whole or in part by the EMF section 350 of the server 140. A second event may be generated by the EMF section 350 at an operation 608 which relates to an object status in a database. The first event and the second event may be chained together in various embodiments to generate a third event (e.g., an EMF event) by the EMF section 350 at an operation 610. The third event may enable implementations consistent with the present disclosure to form a complete picture of a before state and an after state of an object. The third event may optionally include additional configuration information specific to the class of object being updated. Interaction with object data and/or the at least a portion of information associated with the object may be enabled at an operation 612. As the third event includes relevant information about the modification, any application is capable of consuming the event and taking one or more actions in response using at least one the listener 148.

FIG. 7 illustrates an embodiment of a method for deleting an object according to aspects of the present disclosure. A process 700 includes an operation 702 where a delete object command is received. This may include a user of a device 110 selecting an object deleting element of an interface 10, for example using a graphical user interface (GUI) thereof. The delete object command may be received from a user and may include a user deleting an existing row via a mapping interface of the interface 10. A first event (e.g., an "On Delete Event") may be generated by a mapping interface of the interface 10 at an operation 704 responsive to the received delete object command. The first event may be captured by the EMF section 350 at an operation 706 and may be supplemented with configuration information such as object class information. This may include the EMF section 350 capturing the event and supplementing it with configuration information specific to the class of object being deleted. A second event may be generated by the EMF section 350 at an operation 708 using information associated with the captured event and/or supplemental event information (e.g., in relation to a commit operation associated with the delete command). The second event information may then be transmitted to one or more listeners 148 at an operation 710. For example, the second event may be seen as a transformed call associated with the first event which is provided to the listener(s) (e.g., as a "Before Delete Event"). The additional contextual information in the second event may allow one or more applications consuming it to prepare for the object to be deleted and to assess and/or resolve any issues that the deletion may cause to related objects. One or more operations related to the object deletion may then be performed at an operation 712, for example by the one or more applications and/or by or in conjunction with the EMF section 350 and/or server 140. One or more events and/or notices may be optionally provided to the listener(s) 148 corresponding to the deletion.

Figure 8:
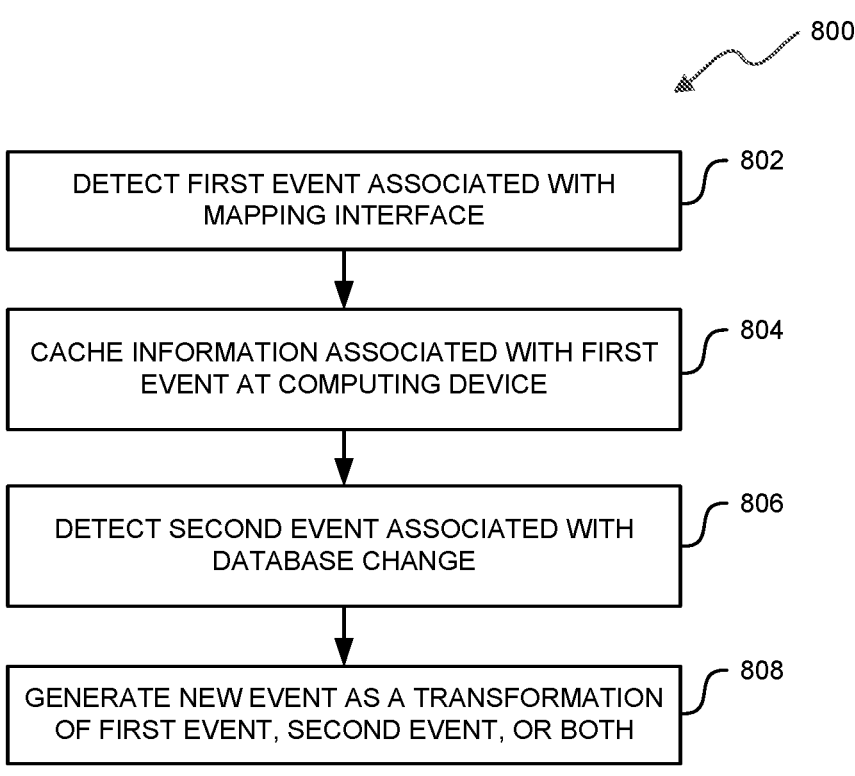
FIG. 8 illustrates an embodiment of a method for generating an object event according to aspects of the present disclosure.

FIG. 8 illustrates an embodiment of a method for generating an object event according to aspects of the present disclosure. A process 800 includes an operation 802 where first event associated with a change made via a mapping interface of a GIS is detected. At an operation 804 information associated with the first event is cached in a memory of a computing device (e.g., server). At an operation 806 a second event associated with committing of the change in a database of the GIS is detected. At an operation 808 a new event that is a transformation of the first event stored in the memory, the second event, or both is generated in response to detecting the second event.

The detecting the first event may occur at a client device of the GIS, and the caching information, the detecting the second event, and the generating the new event may be performed by an EMF executing on the computing device of the GIS. An indication of the first event may be transmitted from the client device to the computing device. The method may include transmitting the new event to one or more listeners and performing at least one operation by at least one of the one or more listeners responsive to the transmitted new event. The change made may be an object creation operation, and the first event may be an object creation event. The change made may be an object change operation and the first event may be an object change event. The change made may be an object deletion operation and the first event may be an object delete event. The transformation of the first event stored in the memory, the second event, or both may include one or more of reordering, supplementing, correcting, or chaining the first event stored in the memory, the second event or both.

Figure 9:
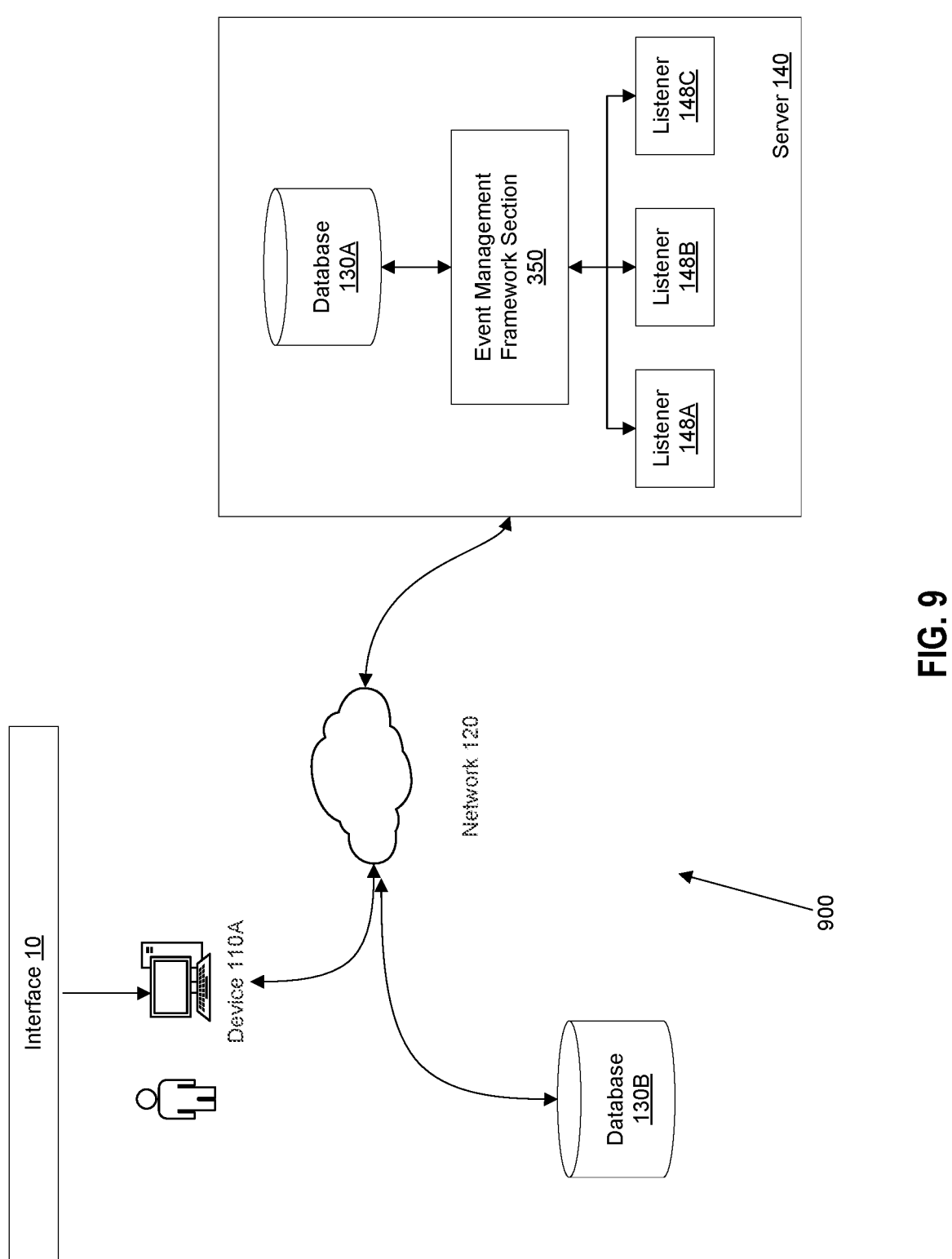
FIG. 9 illustrates an embodiment of a simplified network block diagram of a system for providing an event management framework according to aspects of the present disclosure.

FIG. 9 illustrates an embodiment of a simplified network block diagram of a system for providing an event management framework according to aspects of the present disclosure. The system 900 includes at least one device 110 (e.g., a device 110A as depicted by FIG. 9). The device 110 may include or may be configured to access an interface 10 as previously described herein. The device 110 may be communicatively coupleable to a network 120, such as the Internet, an intranet, or combination thereof. A server 140 may be communicatively coupleable to the network 120. Although a single server 140 is illustrated by FIG. 9 it should be appreciated that two or more servers 140 may be implemented without departing from the spirit and scope of the present disclosure. A simplified view of the server 140 may include a database 130A configured to store at least one data set, an event management framework section 350, and one or more listener (e.g., listener 148A, 148B, 148C, although any number of listeners may be implemented according to aspects of the present disclosure.

In operation, a mapping interface of the interface 10 may enable a user of the device 110 to provide one or more commands or operations in association with at least a portion of data associated with the database 130A. This may include GIS data in various embodiments but is not limited to only GIS data. The mapping interface of the interface 10 may be configured to generate a first event responsive to the one or more commands or operations received at the interface 10 and may transmit the first event, information relating to the first event, and/or an indication of the first event via the network 120. The server 140 may be configured to obtain the first event, the information relating to the first event, and/or the indication of the first event via the network. The first event may relate to one or more sets of data or objects associated with the database 130A. The EVF section 350 of the server 140 may be configured to detect the first event, to store the first event, information relating to the first event, or combination thereof, for example at a memory or storage thereof. The EMF section may be configured to generate a second event relating to the first event, such as a commit operation of the database 130A and/or database 130B responsive to the first event. The EMF section may be configured to generate an EMF event responsive to the second event, the second event including one or more of reordering, supplementing, correcting, or chaining the first event, the second event, or both. The EMF event may be provided to one or more listeners 148 which are registered to receive notifications relating to the first event and/or to an associated object or set of information. The listener(s) 148 may then perform one or more operations responsive to receiving the EMF event. One or more communications and/or operations associated therewith may be transmitted and/or performed at an entity or location other than the server 140, for example by transmitting one or more messages, commands, or representations from the server 140 via the network 120.

As described above, a GIS software application typically has a frontend that includes a mapping interface visualizing a utility network and providing a user interface, and a backend that comprises one or more databases storing data describing the utility network. When a user makes changes to the utility network (e.g., by creating a new object, deleting an existing object, updating an existing object, and the like), the mapping interface generates an event. The event is then pushed to the backend to be committed. One of the drawbacks of the existing way of managing events is that the events contain only partial information. For example, an event may indicate that a row has been created but the information about the row (e.g., table name, row number, data fields, data field values, etc.) is inaccessible to another application because the event has not been pushed to the backend database. When the event is finally pushed to the database, another event is generated indicating that the edit is complete. However, this event is also not useful because it lacks information about the specific edit that was completed (e.g., which row? Which data field? What data values). Implementations of EMFs as disclosed herein may overcome these and other drawbacks and provides several benefits over the prior art as described herein.

In one embodiment, the EMF section 350 is a software code that can reside inside a GIS software element (e.g., at server 140). The EMF section 350 can listen for and capture a first event generated at the frontend (e.g., interface 10 at client device 110) by caching information about the change associated with the first event. When a second event indicating the change is completed is generated by the backend (e.g., GIS server), the Framework can generate its own event (hereinafter "after event") that is a transformation of the first and/or second events. The specific transformations may depend on the type of event.

1. On Create Event

When a user creates a new object (e.g., new row) via the mapping interface, the mapping interface generates a first event ("On Create Event"). The Event Management Framework in response to the first, extracts the information associated with the event and caches the information in memory. When the change is committed in the database, a second event ("Edits Completed") event is generated to indicate that the new object exists in the database. However, as described above, no useful information is included in the second event to enable another application to take any action in response to the event. The Event Management Framework, in response to the second event, generates a new event ("After Created Event") that includes some or all the information relating to the creation of the new object that has been committed to the database, and may include additional configuration information specific to the class of object being created. As the new event includes all relevant information about the creation of the new object in the database, any application can consume the event and take any actions in response to the event.

2. On Update Event

When a user updates an object (e.g., a row) via the mapping interface, the interface generates a first event ("On Update Event") which includes information corresponding to the first or before state of the row. When the update is pushed to the database, a second event ("Edit Completed") event is generated. Without EMF, when the database is queried for changes to the row, it would be possible to see the after state of the row but information about the before state of the row is lost. The Event Management Framework, in response to the first event, captures and caches the event. When the second event is generated, the EMF chains the first and second events together to generate a new event that makes it possible to form a complete picture of the before and after states of the object. The generated EMF event may also include additional configuration information specific to the class of object being updated.

3. On Delete Event

When a user deletes an object via the mapping interface, the mapping interface generates a first event ("On Delete Event"). The EMF section 350 captures the event and supplements it with configuration information specific to the class of object being deleted. It then forwards that transformed call on to the listeners ("Before Delete Event"). The additional contextual information in the EMF event allows applications consuming it to prepare for the object to be deleted and assess and/or resolve any issues that the deletion may cause to related objects.

In addition to transforming two or more events into a single useful event that is consumable by other applications, the EMF described herein has another benefit. In the prior art, each application that wants to consume an event, has to create its own code. In an example of a fiber optic cable application, there are hundreds of tables corresponding to different kinds of cables, buffer tubes, etc., and many possible events. This would require thousands of lines of additional code and engineering time for configuration. With the EMF, it is possible to reuse the same piece of code (e.g., event handler) to handle multiple events and map the piece of code to individual tables. This feature makes the EMF highly configurable, and the same code can be quickly adapted for different utility networks such as fiber optics, electric, water, gas, and/or the like.

Implementations consistent with the present disclosure may include a method of managing events in a GIS. The method includes detecting a first event associated with a change made via a mapping interface of the GIS, caching information associated with the first event in a memory of a computing device, detecting a second event associated with committing of the change in a database of the GIS, and in response to detecting the second event, generating a new event that is a transformation of the first event stored in the memory, the second event or both. The detecting the first event occurs at a client device of the GIS, and the caching information, the detecting the second event, and the generating the new event are performed by an EMF executing on the computing device of the GIS. An indication of the first event may be transmitted from the client device to the computing device. The method may include transmitting the new event to one or more listeners and performing at least one operation by at least one of the one or more listeners responsive to the transmitted new event. The change made may be an object creation operation, and the first event may be an object creation event. The change made may be an object change operation and the first event may be an object change event. The change made may be an object deletion operation and the first event may be an object delete event. The transformation of the first event stored in the memory, the second event, or both may include one or more of reordering, supplementing, correcting, or chaining the first event stored in the memory, the second event or both.

Implementations consistent with the present disclosure may include a system for providing event management for data operations. The system includes a communication network, a device, and a server. The device includes a processor, a device communication section configured to enable communications over the communication network, an interface configured to enable access to GIS data and configured to receive one or more events associated with at least a portion of the GIS data, a device storage configured to store GIS data associated with the interface, and a GIS module configured to generate a first event of the one or more events associated with the interface and to transmit the first event via the communication section. The server includes a processing section, a server communication section configured to enable communications over the communication network, a GIS database configured to store GIS information, a GIS operation section configured to receive the first event from the device and to perform at least one operation in association with the GIS database based at least in part upon the first event; an Event Management Framework (EMF) section configured to detect the first event and to generate a second event based at least in part upon a status of the at least one operation performed by the GIS operation section responsive to the first event, the EMF section further configured to generate an EMF event which is a transformation of the first event, the second event or both, and at least one listener configured to obtain the EMF event and to coordinate at least one listener operation response to obtaining the EMF event. The first event may be an object creation event received at the interface of the device. The first event may be an object change event received at the interface of the device. The first event may be an object deletion event received at the interface of the device. The server may include a memory and the EMF section may cache the first event or information associated with the first event at the memory responsive to detecting the first event. The transformation of the first event, the second event or both may include one or more of reordering, supplementing, correcting, or chaining the first event, the second event or both. The second event may be a commit operation performed by the GIS database.

Details of an exemplary computing system that may be used to implement various embodiments of this disclosure is described below. In general, any general-purpose computer systems used in various embodiments of this disclosure may be, for example, general-purpose computers such as those based on Intel® Pentium-type processor, Motorola® PowerPC, Sun® UltraSPARC®, Hewlett-Packard® PA-RISC processors, or any other type of processor. Such computer systems may be either physical or virtual.

For example, various embodiments of the disclosure may be implemented as specialized software executing in a general-purpose computer system. The computer system may include a processor connected to one or more memory devices, such as a disk drive, memory, or other device for storing data. Memory is typically used for storing programs and data during operation of the computer system. The computer system may also include a storage system that provides additional storage capacity. Components of computer system may be coupled by an interconnection mechanism, which may include one or more busses (e.g., between components that are integrated within the same machine) and/or a network (e.g., between components that reside on separate discrete machines). The interconnection mechanism enables communications (e.g., data, instructions) to be exchanged between system components of system.

Computer system also includes one or more input devices, for example, a keyboard, mouse, trackball, microphone, touch screen, and one or more output devices, for example, a printing device, display screen, speaker. In addition, computer system may contain one or more interfaces (not shown) that connect computer system to a communication network (in addition or as an alternative to the interconnection mechanism).

The storage system typically includes a computer readable and writeable nonvolatile recording medium in which signals are stored that define a program to be executed by the processor or information stored on or in the medium to be processed by the program to perform one or more functions associated with embodiments described herein. The medium may, for example, be a disk or flash memory. Typically, in operation, the processor causes data to be read from the nonvolatile recording medium into storage system memory that allows for faster access to the information by the processor than does the medium. This storage system memory is typically a volatile, random-access memory such as a dynamic random-access memory (DRAM) or static memory (SRAM). This storage system memory may be located in storage system, as shown, or in the system memory. The processor generally manipulates the data within the memory system and then copies the data to the medium after processing is completed. A variety of mechanisms are known for managing data movement between the medium and the integrated circuit memory element, and the disclosure is not limited thereto. The disclosure is not limited to a particular memory, memory type or storage system.

The computer system may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system is shown by way of example as one type of computer system upon which various aspects of the disclosure may be practiced, it should be appreciated that aspects of the disclosure are not limited to being implemented on the computer system. Various aspects of the disclosure may be practiced on one or more computers having a different architecture or components. Further, where functions or processes of embodiments of the disclosure are described herein (or in the claims) as being performed on a processor or controller, such description is intended to include systems that use more than one processor or controller to perform the functions.

Computer system may be a general-purpose computer system that is programmable using a high-level computer programming language. Computer system may be also implemented using specially programmed, special purpose hardware. In computer system, processor is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having,"

"containing," "involving," and variations herein, are meant to be open-ended, i.e., "including but not limited to."

The various embodiments disclosed herein may be implemented as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML, or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method of managing events in a Geographic Information System (GIS), comprising:

detecting a first event associated with a change made to a preexisting object via a mapping interface of the GIS, wherein the change made is to update the preexisting object to continue to exist with a property modified by updating the property of the preexisting object from an initial value to an updated value;

caching information associated with the first event in a memory of a computing device, the caching including capturing the initial value prior to updating the property to the updated value and storing the initial value in the memory;

detecting, in a database of the GIS, a second event associated with committing of the change; and in response to detecting the second event, generating a new event that is a transformation of the first event stored in the memory and the second event, wherein the new event makes available both the initial value and the updated value.

2. The method of claim 1, wherein the first event is detected at a client device of the GIS, and wherein the information is cached, the second event is detected, and the new event is generated by an Event Management Framework (EMF) executing on the computing device of the GIS.

3. The method of claim 2, further comprising transmitting an indication of the first event from the client device to the computing device.

4. The method of claim 1, further comprising:

transmitting the new event to one or more listeners; and performing at least one operation by at least one of the one or more listeners responsive to the transmitted new event.

5. The method of claim 4, wherein the one or more listeners are registered to receive notifications associated with one or more of the first event, the preexisting object, or the information.

6. The method of claim 1, wherein the transformation of the first event stored in the memory and the second event includes one or more of reordering, supplementing, correcting, or chaining the first event stored in the memory and the second event.

7. The method of claim 1, wherein the new event includes additional configuration information specific to a class of the preexisting object being updated.

8. The method of claim 1, further comprising:

detecting a third event associated with a creation of a new object via the mapping interface of the GIS;

caching information associated with the third event in the memory of the computing device;

detecting, in the database of the GIS, a fourth event indicating that the new object exists in the database; and in response to detecting the fourth event, generating a new event that is a transformation of the third event stored in the memory and the fourth event, wherein the new event makes available the information associated with the third event.

9. The method of claim 1, further comprising:

detecting a fifth event associated with a deletion of the preexisting object via the mapping interface of the GIS;

caching information associated with the fifth event in the memory of the computing device, wherein the information includes additional configuration information specific to a class of the preexisting object being deleted;

detecting, in the database of the GIS, a sixth event indicating that the preexisting object is being delete; and in response to detecting the sixth event, generating a new event that is a transformation of the fifth event stored in the memory and the sixth event, wherein the new event makes available the information associated with the fifth event.

10. The method of claim 1, further comprising:

receiving one or more commands or operations via a user interface, wherein the first event is detected in response to the one or more commands or operations.

11. The method of claim 1, wherein the first event is associated with one or more sets of data associated with the database, one or more objects including the preexisting object associated with the database, or a combination thereof.

12. A server for managing events in a Geographic Information System (GIS), the server comprising:

a processor;

a memory;

a GIS database configured to store GIS information;

a GIS operation section configured to receive a first event and to perform at least one operation in association with the GIS database based at least in part on the first event; and an Event Management Framework (EMF) section configured to:

detect the first event associated with a change made to a preexisting object via a mapping interface of the GIS, wherein the change made is to update the preexisting object to continue to exist with a property modified by updating the property of the preexisting object from an initial value to an updated value;

cache information associated with the first event in the memory, the caching including capturing the initial value prior to updating the property to the updated value and storing the initial value in the memory;

generate a second event based at least in part on a status of the at least one operation performed by the GIS operation section responsive to the first event, wherein the second event is associated with committing of the change performed by the GIS database; and generate an EMF event that is a transformation of the first event stored in the memory and the second event, wherein the EMF event makes available both the initial value and the updated value.

13. The server of claim 12, wherein the transformation of the first event and the second event includes one or more of reordering, supplementing, correcting, or chaining the first event and the second event.

14. The server of claim 12, wherein the EMF event includes additional configuration information specific to a class of the preexisting object being updated.

15. The server of claim 12, wherein the EMF section is further configured to:

detect a third event associated with a creation of a new object via the mapping interface of the GIS;

cache information associated with the third event in the memory;

detect, in the GIS database, a fourth event indicating that the new object exists in the GIS database; and in response to detection of the fourth event, generate a new event that is a transformation of the third event stored in the memory and the fourth event, wherein the new event makes available the information associated with the third event.

16. The server of claim 12, wherein the EMF section is further configured to:

detect a fifth event associated with a deletion of the preexisting object via the mapping interface of the GIS;

cache information associated with the fifth event in the memory, wherein the information includes additional configuration information specific to a class of the preexisting object being deleted;

detect, in the GIS database, a sixth event indicating that the preexisting object is being deleted; and in response to detection of the sixth event, generate a new event that is a transformation of the fifth event stored in the memory and the sixth event, wherein the new event makes available the information associated with the fifth event.

17. The server of claim 12, wherein the first event is associated with one or more sets of data associated with the GIS database, one or more objects including the preexisting object associated with the GIS database, or a combination thereof.

\* \* \* \* \*